(12) United States Patent
Volk

(10) Patent No.: US 6,648,946 B2
(45) Date of Patent: Nov. 18, 2003

(54) PROCESS FOR RECOVERING HELIUM USING AN EDUCTOR

(75) Inventor: James Joseph Volk, Clarence, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/871,365

(22) Filed: May 31, 2001

(65) Prior Publication Data

US 2001/0047722 A1 Dec. 6, 2001

Related U.S. Application Data

(60) Provisional application No. 60/209,837, filed on Jun. 6, 2000.

(51) Int. Cl.$^7$ .............................. F25D 13/06; F24F 3/16; C03B 25/00
(52) U.S. Cl. .................................. 95/273; 62/63; 62/78; 62/265; 62/322; 65/434; 65/510; 432/176; 432/199
(58) Field of Search ................................ 95/273; 62/63, 62/78, 265, 322; 65/434, 510; 432/176, 199

(56) References Cited

U.S. PATENT DOCUMENTS

| | | | |
|---|---|---|---|
| 3,785,120 A | | 1/1974 | Merriman et al. |
| 4,115,235 A | | 9/1978 | Capone |
| 4,543,190 A | * | 9/1985 | Modell ................ 210/721 |
| 4,613,412 A | | 9/1986 | MacDermid |
| 4,664,689 A | | 5/1987 | Davis |
| 4,990,371 A | * | 2/1991 | Dutta et al. .............. 427/213 |
| 5,090,637 A | | 2/1992 | Haunschild |
| 5,377,491 A | | 1/1995 | Schulte |
| 5,386,707 A | | 2/1995 | Schulte et al. |
| 5,452,583 A | | 9/1995 | Schulte |
| 5,795,146 A | | 8/1998 | Orbeck |
| 5,836,745 A | | 11/1998 | Brogan et al. |

* cited by examiner

*Primary Examiner*—Duane Smith
*Assistant Examiner*—Minh-Chau T. Pham
(74) *Attorney, Agent, or Firm*—Robert J. Follett

(57) ABSTRACT

This invention is directed to a process for recovering helium. The process includes a) passing a first gas containing helium to an eductor to produce a second gas; b) passing the second gas through a heat exchanger to produce a third gas; and c) recovering the third gas into the eductor to combine with the first gas.

19 Claims, 1 Drawing Sheet

PROCESS FOR RECOVERING HELIUM USING AN EDUCTOR

This application claims the benefit of Provisional Application No. 60/209,837, filed Jun. 6, 2000.

FIELD OF THE INVENTION

This invention is related to the recovery and recycling of gases. More particularly, this invention is related to the recovery and recycling of helium of from about 30% to 70% by volume in the production of optical fibers from the draw tower cooling tubes of the production apparatus.

BACKGROUND OF THE INVENTION

The present state of the art for optical fiber manufacturing generally starts with the production of a specially prepared glass rod or preform. The preform is processed in a fiber drawing station to produce the optical fiber. A specially prepared glass preform is fed into a furnace where the glass melts, forming a semi-liquid fiber. As the fiber falls through the air and through a heat exchanger (chiller) it cools and solidifies. Following cooling, the fiber is coated and spooled. The draw rate is controlled by the rate of cooling in the space between the furnace and the coating applicator. In order to increase the rate of cooling, a small amount of gas is often applied to the fiber heat exchanger. Helium is generally used as the gas in this heat exchanger because it provides a high heat transfer rate and is inert. The heat exchanger generally consists of an aluminum or stainless steel block bored for a minimum diameter to allow the fiber to travel through it. Helium or a mixture of helium and air or nitrogen is also fed into the cylindrical channel where it flows out one or both ends of the block into the surrounding atmosphere. Heat is dissipated from the glass fiber through the helium and, into the wall of the heat exchanger. The heat exchanger can have conductive metal fins to dissipate the heat from the heat exchanger metal surface or the heat exchanger can be manufactured with an additional water-jacketed cooling source.

Helium consumption during the optical fiber draw cooling process varies from a few standard liters per minute (slpm) of helium to several hundred standard liters per minute of helium per heat exchanger. The prior art has disclosed helium recovery from and recycle to fiber optic drawing. See, U.S. Pat. Nos. 5,377,491 and 5,452,583.

These prior art include the use of rotating or reciprocating compression equipment, analytical equipment and controls to recover and recycle helium to the fiber optic drawing station heat exchangers. The decision to utilize this type of recovery method is determined by the quantity of helium used per heat exchanger, the cost of helium as well as the cost to purchase, operate and maintain the recovery system. The ultimate question that the fiber optics producer must determine is whether it is economically beneficial to invest in drawing tower helium recovery technology on a site-specific basis.

Generally, for applications where very low volumes of helium are used in the drawing tower heat exchangers (5–50 slpm per heat exchanger), current recovery technologies may not be economically viable.

The objective of this invention is to provide optical fiber producers with a low cost option for helium recovery and recycle. This is achieved by providing a helium recovery system which will result in 30% to 70% recovery of helium from each heat exchanger unit, without the use of any moving parts such as compressors, vacuum pumps, control valves and without the need of analytical equipment.

The prior art primarily uses "once through helium" to cool the fiber during the drawing process or are using helium recovery and recycle technology (at a substantially higher helium flow than the present invention) to cool the fiber.

The prior art generally utilizes moving parts such as compressors, vacuum pumps and control valves. It would be desirable to provide a helium recovery system that uses no moving parts.

It would be desirable to use an eductor to facilitate helium recovery in a small-scale fiber optic cable manufacturing process. The prior art eductors are commonly used for mixing, evacuating, draining, drying, and many other routine process applications. The motive stream can be almost any fluid, and it can be used to move a suction stream composed of gases, liquids, or powder-type solids. The discharge stream combines the motive stream and suction stream and in most applications is significantly different from either of them. In the proposed helium recovery and recycle application, all three streams are basically the same regarding composition and properties.

Some types of eductors have been known. For example, U.S. Pat. No. 5,836,745 discloses a fluid recovery apparatus and method using a motive force, which includes the use of an eductor for recovering fluid from a liquid formation. It discloses a liquid submersible pump for pumping fluid from the liquid formation. There is no teaching or suggestion in this art for the recovery of helium gas and or other rare gases and does not recover a liquid.

U.S. Pat. No. 4,613,412 discloses an evacuator system and process for an evaporative recovery system, which uses an eductor to create a partial vacuum in an evaporative waste recovery system. It uses a fluid as the motive to the eductor in order to evacuate concentrate and distillate from an evaporator. There is no teaching or suggestion in this art for recovering and recycling helium gas or other rare gases.

U.S. Pat. No. 4,115,235 discloses an apparatus for conveying a gas sample through an analyzer chamber. The prior art uses an eductive loop in conjunction with a convective loop to convey a gas sample through an analyzer. This art does not teach or suggest helium or other rare gases to recover a portion of the gas discharged from the eductor. There is no teaching or suggestion in this art for recovering helium or other rare gases, and recycling these gases back into the system for re-use.

U.S. Pat. No. 5,795,146 discloses a furnace chamber having eductor to enhance thermal processing. This art discloses a furnace for thermally processing product and includes one or more eductors. The eductor(s) provides for increased circulation of atmosphere within the furnace for heat transfer or outgassing purposes. This patent discloses an eductor to increase circulation within a furnace chamber but does not use the eductor to recover helium or other rare gases.

It is desirable in the art to provide for a fiber optic manufacturing process and system, which recovers and recycles helium and other rare gases at a lower cost than that associated with the present gas recovery and recycling technology.

It is desirable to provide such a process that requires no moving parts, requires no power, requires no rotating compression equipment, can be installed as part of the fiber producer's existing heat exchanger supply piping, and requires little or no maintenance.

Further, it is desirable to provide an economical method and system for the fabrication, installation, operation and maintenance of this equipment, which is particularly beneficial to the small volume helium recovering and recycling users.

SUMMARY OF THE INVENTION

This invention is directed to a process for recovering helium. The process comprises a) passing a first gas containing helium to an eductor to produce a second gas; b) passing the second gas through a heat exchanger to produce a third gas; and c) recovering the third gas into the eductor to combine with the first gas.

In one embodiment, the second gas may pass through a cooler. The second gas and/or third gas may pass through a rotometer. The third gas may be split into a top portion and a bottom portion as it emerges from the heat exchanger, and the flow of both the top portion and the bottom portion as they emerge from the heat exchanger may be partially regulated by flow control means, for example, valves. Particulate removing devices such as filters may be used to remove particulate from the third gas prior to combining with the first gas in the eductor.

As used herein, the term eductor means a hydraulic device. It may consists of a nozzle and venturi throat, used to create a negative pressure (suction) by discharging a high pressure motive stream fluid through a nozzle as a concentric, high speed jet flowing past or through a suction stream inlet tube into a discharge chamber. The negative pressure generated thus inducing a positive draw of suction stream material through the inlet tube and into the discharge chamber.

As used herein, the term rotometer means a device for measuring gas flow. One example is a simple cylindrical apparatus through which air flows and the rate of flow is measured.

BRIEF DESCRIPTION OF THE DRAWINGS

Other objects, features and advantages will occur to those skilled in the art from the following description of one preferred embodiment and the sole accompanying drawing, in which.

DETAILED DESCRIPTION OF THIS INVENTION

Figure 1:
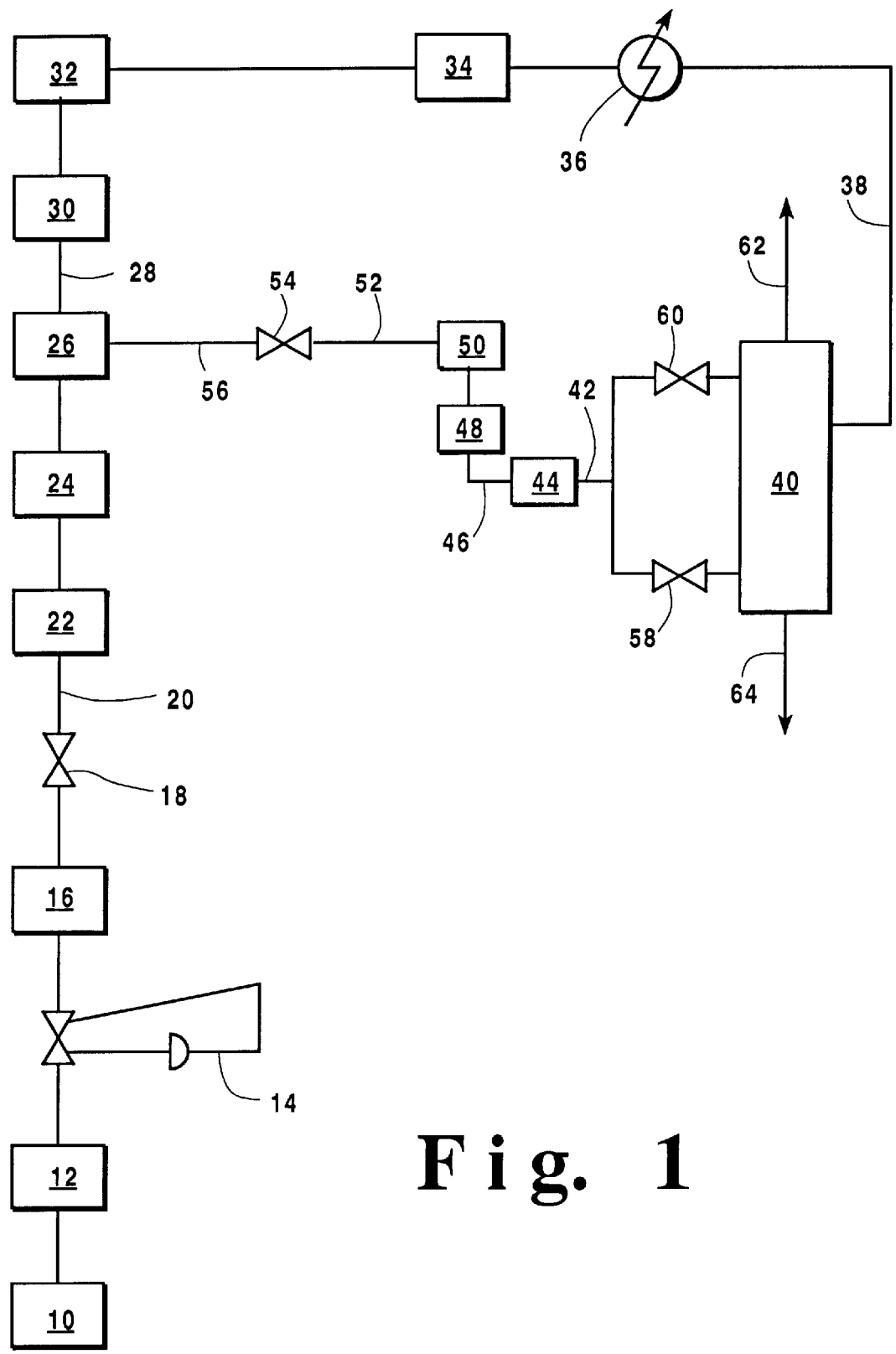
FIG. 1 is a schematic representation of a small scale gas recovery system for recovering and recycling gases according to this invention.

This invention presents a concept to recover and recycle helium used in optical fiber drawing station heat exchangers without the need for rotating or reciprocating compression equipment. An object of this invention is to provide an economical helium recovery unit for optical fiber draw tower heat exchanger, which is small enough to be integrated into the user's existing helium feed system as well as requiring no moving parts. The recovery system will yield preferably 40% to 60% recovery of helium, more preferably between 30% to 70% recovery of helium, and most preferably over 80% recovery of helium, for nominal heat exchanger helium feed rates preferably between 5 slpm and 50 slpm, and more preferably between 10 slpm and 40 slpm, and most preferably between 15 to 30 slpm per heat exchanger.

The process flow diagram for this approach is shown as FIG. 1. Helium 10 is fed to each heat exchanger 40 through flow measuring device 12, for example, a rotameter, prior to passing to pressure regulator 14. The helium gas (known as motive) then passes through pressure measuring device 16 and then through control valve 18, which may be a manual or automatic valve, before this pressure regulated helium passes through a flow measuring device 22, for example, a rotameter, and particulate filter 24, before entering eductor 26. The eductor nozzle configuration results in a pressure drop of the inlet helium supply (motive) thus creating a venturi effect on the suction side of the eductor 26. This venturi effect pulls helium supply 42 from the heat exchanger 40, into the eductor 26 via stream 56. The total flow of helium 38 is directed to each heat exchanger 40 via stream 56. The total flow of helium 38 to each heat exchanger 40 via stream 28 is measured by flow measuring device 32, for example a rotameter, located at the discharge of eductor 26. Helium gas 28 passed through filter 30 before passing to flow measuring device 32. This flow of gas 28 represents combined flow of helium from streams 20 and 56. Stream 20 represents make-up helium and stream 56 represents recovered helium. Helium stream 42 from heat exchanger 40, regulated through flow control means, for example, valves 58 and 60, which may be manual of automatic, passes through filter 44 to remove entrained particulates. Recovered helium flow from each heat exchanger 40 is measure by flow measuring device 50, for example, a rotameter, located after helium stream 46 was treated from filter 44. Helium stream 46 flows through flow measuring device 50 prior to forming helium stream 52. Isolation valve 54, which may be manual or automatic, at the suction to the eductor is used to isolate the flow of helium 52 from heat exchanger 40 to form recovered helium 56 for passage to eductor 26. Since approximately 30% to 70%, preferably 40% to 60%, of the helium supply to each heat exchanger 40 is recovered, no analytical equipment is required to monitor helium purity. The helium gas that is not recovered escapes to atmosphere from the top and bottom openings at each heat exchanger 40 as unrecovered helium gas 62 and 64.

An optional cooler 36 can be installed in stream 28 to cool the helium prior to entering heat exchanger 40. A plurality of coolers may be used. Each cooler may comprise of a plurality of cooling tubes. Purity analysis and control unit 34 and flow control unit 48 are optionally placed in the system to control the flow of gas flowing in the system. Further, this invention contemplates a plurality of eductors, preferably placed in sequence to effectuate the gas flow.

The system can be operated with or without recovery. Under normal operation the total flow of helium to each heat exchanger is controlled with the manual control valve. As flow is introduced into the eductor, the venturi effect draws the recovered helium from the heat exchanger into the suction of the eductor. If the manual isolation valve at the suction to the eductor is shut, the flow of helium to each heat exchanger is still controlled by the manual control valve, however, there is no recovered helium flow from the heat exchanger. The manual control valve could be replaced by an automatic control valve, if desired. Other flow measuring devices could also be used to measure total helium flow to each heat exchanger and total recovered helium flow from each heat exchanger. A single eductor could be used to supply helium to one or several heat exchangers, if desired. As an option, an in-situ oxygen analyzer could be installed on the suction to eductor 26 from stream 42. This device could close an automatic valve on the suction of the eductor or provide an alarm based on an indication of a high level of air contaminants from the fiber heat exchanger.

The small-scale recovery technology is a unique technology not taught or suggested by the art in a number of ways. The eductor-based recovery system utilizes pressure drop across a venturi throat (eductor) to pull helium from the optical fiber cooling tube and into the recovery unit. Prior art technology utilizes a vacuum pump or compressor to pull the helium from the optical fiber cooling tube. The amount of helium pulled from the cooling tube in prior art technology was controlled by a control valve usually at the inlet to the compressor or vacuum pump. Current technology for recovery also utilizes an oxygen sensor to control the amount of helium pulled from the cooling tube. The oxygen sensor limits the amount of helium pulled from the cooling tube such that no contaminants such as air are also pulled into the suction of the compressor or vacuum pump. Since most compressors and vacuum pumps are sized for capacities that exceed the amount of helium needed to be recovered, elimination of a control valve on the compressor or pump suction may result in gas volume into the recovery unit that are in excess of the amount of helium fed into the cooling tube. This will result in the pump or compressor pulling contaminants into the recovery unit.

The eductor-based recovery technology of this invention has no moving parts. The maximum percentage of helium recovered from the cooling tube is limited by the eductor design (throat clearances). It is expected that a maximum of 80% of helium can be recovered from the cooling tube, thus eliminating the possibility of air contaminants to be drawn into the recovery system. This eliminates the need for automatic control of helium gas into the recovery unit and also eliminates the need for analytical equipment.

Now, by the use of the present invention, one can recover helium by the use of an eductor, and without the use of moving parts such as compressors, vacuum pumps and control valves. Although the invention has been described in detail with reference to the embodiment herein, it is appreciated that there are a number of other embodiments which are within the spirit and scope of the claims.

What is claimed is:

1. A process for recovering helium comprising:
    a) passing a first gas containing helium to an eductor to produce a second gas that includes helium;
    b) passing the second gas through a heat exchanger to produce a third gas that includes helium; and
    c) recovering the third gas into the eductor to combine with the first gas, thereby recovering helium.

2. The process of claim 1 which further comprises passing the first gas through a regulator.

3. The process of claim 1 which further comprises passing the first gas through a manual valve.

4. The process of claim 1 which further comprises passing any of the gases through a pressure regulator controlled from one of the gases.

5. The process of claim 1 which further comprises passing any of the gases through a cooler.

6. The process of claim 1 which further comprises passing any of the gases through a flow measuring device.

7. The process of claim 1 which further comprises passing any of the gases through a filter.

8. The process of claim 1 which further comprises passing any of the gases through a control valve.

9. The process of claim 1 which further comprises passing the third gas through a purity measuring device and a flow control device.

10. The process of claim 1 which further comprises controlling the flow of the second gas through a flow measuring device on the second gas stream and a flow controlling device on the first or third gas.

11. The process of claim 1 wherein the second gas is split into a plurality of locations on the cooling tube.

12. The process of claim 1 wherein the second gas is split into a plurality of cooling tubes.

13. The process of claim 1 wherein the third gas is split into a plurality of locations on the cooling tube.

14. The process of claim 1 wherein the third gas is split into a plurality of cooling tubes.

15. The process of claim 1 which comprises passing the third gas through a top portion and a bottom portion of the heat exchanger.

16. The process of claim 15 which comprises passing the top portion and bottom portion through at least one flow control means.

17. The process of claim 16 wherein the flow control means is a valve.

18. The process of claim 1 which further comprises passing the third gas through a filter to remove particulates.

19. The process of claim 1 which further comprises a plurality of eductors.

* * * * *